Sept. 26, 1933.                    A. SWANSON                    1,927,855
                        HIGH PRESSURE VALVE OR COCK
                        Filed March 10, 1931         2 Sheets-Sheet 2

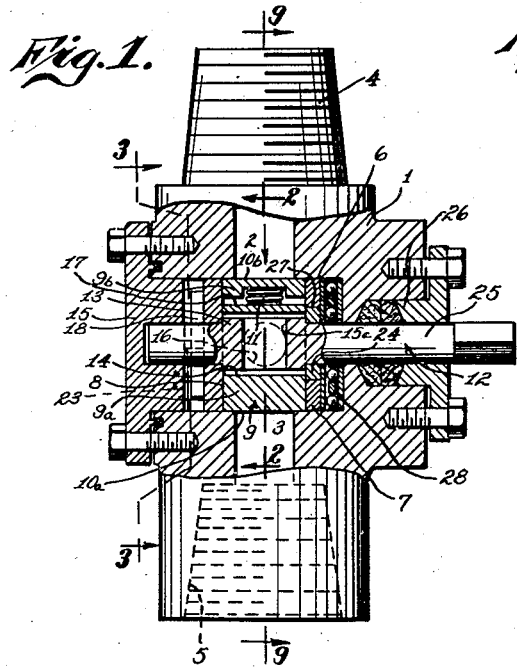

Inventor
Albert Swanson,
By Lyon & Lyon
Attorneys

Patented Sept. 26, 1933

1,927,855

UNITED STATES PATENT OFFICE 1,927,855

HIGH PRESSURE VALVE OR COCK

Albert Swanson, Whittier, Calif., assignor of one-third to Idris Thomas, Whittier, Calif., and one-third to William D. Shaffer, Brea, Calif.

Application March 10, 1931. Serial No. 521,469

7 Claims. (Cl. 251—102)

This invention relates to a high pressure valve or cock of a type which is employed for pipe connections which must sustain very high internal pressure. Rotary plug cocks have been employed in such high pressure service, but due to the taper on the plug these plugs are apt to become very tight and can be rotated only with great difficulty when it is necessary to open or close the cock. It has also been attempted to construct these valves or cocks with plugs which are not tapered, the plug being provided with a transversely guided closure to the back of which the pressure to be sustained is admitted in the closed position of the plug. Where the pressure is very high, the plug of a cock of this type is also rotated with considerable difficulty.

The general object of this invention is to produce a valve or cock of this general type, having a construction which will insure that it will sustain the pressure without leaking in the closed position of the plug, but in which the plug can readily be rotated from its closed position.

A further object of the invention is to provide a construction which will enable the valve to be used to close off the flow from either direction.

Further objects of the invention will appear hereinafter.

The invention consists in the novel parts and combinations of parts to be described hereinafter, all of which contribute to produce an efficient high pressure valve or cock.

A preferred embodiment of the invention is described in the following specification, while the broad scope of the invention is pointed out in the appended claims.

In the drawings:—

Figure 1 is a side view of a valve or cock embodying my invention with the middle portion of the body broken away to show the same in section; the plug and other parts of the valve are likewise shown in section, with the spindle shown partially in elevation. In this view the plug is shown in its closed position.

Fig. 2 is a vertical section taken at about line 2—2 of Fig. 1, but showing the valve in its open position and with the lower portion of the valve body broken away; this view shows portions of the valve body in side elevation.

Fig. 3 is a vertical cross-section taken at about line 3—3 of Fig. 1, and particularly illustrating the connection between the valve spindle and the plug which enables the spindle to have a limited relative movement with respect to the plug in opening or closing the valve.

Fig. 6 is a vertical section and partial elevation taken through a valve or cock embodying the invention and in which the construction is such as to enable the valve to close off pressure coming into the valve from either direction.

Fig. 7 is a cross-section through the valve, shown in Fig. 6, taken about on the line 7—7 of Fig. 6, certain parts being broken away and shown partially in section.

Fig. 11 is a side elevation of the valve spindle illustrated in Fig. 6, but showing the same projected on a plane at right angles to the plane in which the section Figure 6 was taken.

Before proceeding to a detailed disclosure of the invention, it should be stated that in practicing the invention the spindle of the valve or cock is connected with the plug of the cock in such a way that the spindle is capable of a limited rotation in the plug.

In the closed position of the valve the closure is held by the sustained pressure against the outlet in the valve body. In this position of the valve a cam on the spindle permits free movement of the closure against the side of the bore in the valve body. In opening the valve, the first part of the rotation of the spindle moves the cam into a position to withdraw the closure from the valve outlet and the latter part of the rotation of the spindle moves the plug around into a position which will hold the valve open. In the preferred construction, a rotation of 90° of the spindle may be employed to enable the cam to withdraw the closure, and the second 90° moves the spindle and the plug around, carrying the plug through a rotation of 90°. In this way, although the spindle makes a half turn, the plug only rotates through 90°.

In the present specification, the valve is of two types. In one type it is intended to sustain a pressure from one side only of the valve, unless the valve is reversed. In the other type disclosed the valve can sustain pressure exerted in either direction.

Figure 4:
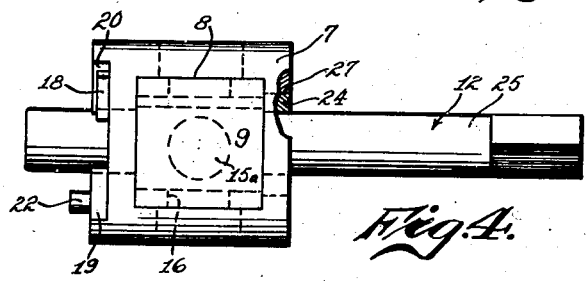
Fig. 4 is a side elevation of the spindle and plug and representing their relation to the movable closure, which is guided to slide in the plug. Certain parts are broken and shown in section.
Figure 8:
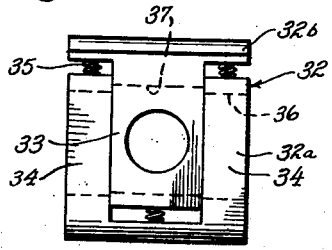
Fig. 8 is a side view of the closure illustrated in Fig. 6 and corresponding to the position in which the closure is shown in Fig. 6.

Referring more particularly to the parts, and particularly to Figs. 1 to 3 and 9, 1 represents the valve body, which is of very substantial construction so as to be capable of sustaining high internal pressure. This body presents two aligning passages 2 and 3, the former of which is the inlet port and the latter of which is the outlet. The valve body is provided with means for connecting it up to a pipe system, for which purpose one side of the valve body may be provided with a tapered pin 4 and the other side with a tapered threaded box 5. The valve body is provided with a bore 6, which is preferably not tapered and which extends from one side of the body on an axis transverse to the axis on which the ports 2 and 3 align. Within this bore there is mounted a plug 7, in the form of a cylindrical head (see Fig. 4), and this plug is provided with a transverse guideway 8 which is preferably of square form. In this guideway 8 a closure 9 slides, said closure consisting of a plug formed in two sections $9^a$ and $9^b$, the former of which constitutes the body of the block. These two sections $9^a$ and $9^b$ have circumferential faces $10^a$ and $10^b$ which are turned on the same radius as the bore 6.

Between the sections $9^a$ and $9^b$ a coiled spring 11 may be placed, which is a light spring not intended to support the pressure, but merely to maintain, normally, the sections $9^a$ and $9^b$ in contact with the wall of the bore 6.

Figure 5:
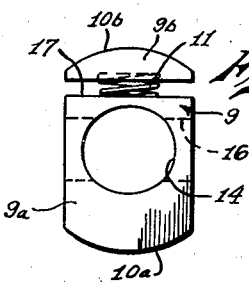
Fig. 5 is a side view of the closure in its upright position, corresponding to Fig. 1.

Rotatably mounted within the head 7, I provide a spindle 12, which spindle is provided within the plug 7 with a cam 13, and this cam is located in a transverse opening or hole 14 that passes through the closure 9. The outer end of the spindle is rotatably mounted in a bearing formed in a cover plate 15 (see Fig. 1). The spindle at the cam is provided with a transverse opening $15^a$, through which the liquid handled by the valve passes when the valve is in its open position (see Fig. 2). At this time the opening $15^a$ will be in alignment with a corresponding passage 16 that passes transversely through the closure 9 (see Fig. 5).

Figure 9:
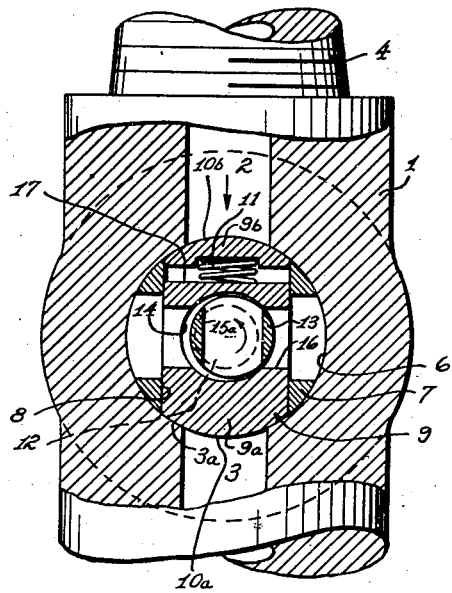
Fig. 9 is a vertical section taken on the line 9—9 of Fig. 1, but upon an enlarged scale; in this view certain parts are broken away.

Referring particularly to Fig. 9, the parts of the valve in this view correspond to the closed position of the valve supporting pressure from the upper side, as indicated by the arrow. This pressure exerts itself immediately on the small section $9^b$ of the closure, which, of course, cannot resist the pressure so that the full force of the pressure of the liquid exerts itself upon the upper surface 17 of the body section $9^a$ of the closure. This holds the closure tightly on the seat $3^a$ formed around the edge of the outlet 3 of the valve.

In this position of the valve, the axis of the cam 13 is disposed substantially at right angles to the axis of the passages 2 and 3. In other words, the narrow diameter of the cam is in line with the passages 2 and 3 so as not to interfere with the movement of the closure section $9^a$ against the seat $3^a$. However, when it is desired to open the valve, by rotating the spindle in the direction indicated in the arrow in Fig. 9, the cam 13 will engage the upper side of the opening 14 and draw the section $9^a$ away from the seat $3^a$. This will occur while rotation of the spindle takes place relative to the plug. This limited rotation amounts to 90° and is permitted by the correlated construction of the spindle and the plug 7. For this purpose, the spindle is provided with a transverse key 18 that cooperates with abutments 19 and 20 on the end of the plug adjacent the cover plate 15. The direction of rotation is that indicated by the arrow in Fig. 3, and free rotation will take place until the key strikes the radial face 21 on the abutment 19, after which the plug will rotate with the spindle.

The rotation of the plug is limited to substantially 90° by any suitable means. For example, I may provide a pin 22 projecting outwardly from the end of the plug and received in a curve slot 23 formed in the adjacent face of the cover plate 15.

In this opening movement of the valve, it will be evident that the spindle 12 makes a half turn, so that at the end of its rotation the passage 16 will have its axis in alignment with the passages 2 and 3. However, the plug will have rotated through only 90°, so that the closure will occupy the position in which it is indicated in Fig. 2. At this time, the passage 16 through the closure will be in alignment with the passage $15^a$, giving free flow through the valve.

In order to close the valve, the spindle would be rotated in the direction of the arrow indicated in Fig. 2. The first 90° of this movement will place the radial axis of the cam at right angles to the direction of travel of the closure, and the next 90° of the movement will bring the plug around to the position indicated in Fig. 9. In this position of the spindle, the cam will permit the free movement of the closure section $9^a$ on to the seat $3^a$.

In order to enable the spindle to be introduced into the plug, one end of the plug is provided with a removable ring 24 (see Fig. 1). In assembling the parts, the plug 9 should be placed on the spindle and then the shank 25 of the spindle shoved through the stuffing box 26. The plug with the closure in place will then lie in the bore 6 and the parts moved around until the collar 24 drops into the counter-bore 27, which is formed in the end face of the plug to receive it.

If desired, a ball bearing 28 can be provided at the inner end of the bore to insure free rotation of the plug.

A valve of the type already described is the single type intended to sustain pressure from one side of the valve. Of course, by setting the plug and spindle in place in a reverse position, the valve could be adapted to sustain pressure from below instead of from above. It is merely necessary that in the closed position of the valve the cam will not interfere with the free movement of the closure on to the outlet passage of the valve.

Figure 10:
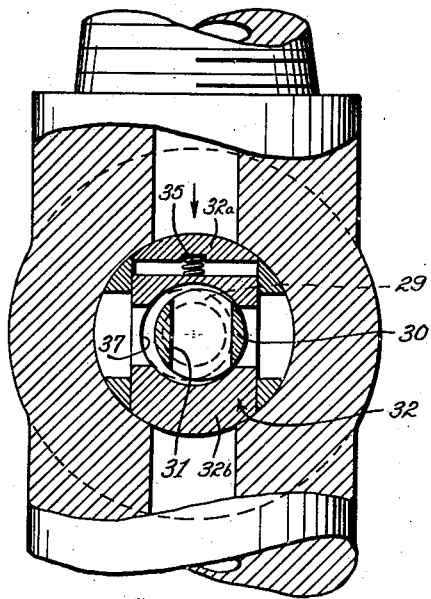
Fig. 10 is a section on the line 10—10 of Fig. 6, but upon an enlarged scale.

If it is desired to embody the invention in a valve capable of closing off a liquid or fluid under pressure exerted in the valve in either direction, I prefer to provide a construction such as illustrated in Figs. 6, 7 and 10.

The general principle and mode of operation of this double valve is substantially the same as that already described in connection with the single form. That is to say, a cam or pair of cams is formed on the spindle corresponding to each direction of closing for the valve.

One cam operates to draw its closure away from one seat or side of the valve, and the other cam or cams operate to draw its closure away from its seat during the opening movement of the valve. Fig. 11 illustrates the form of a spindle 28 adapted for this double type of valve. This spindle has two cams 29 exactly alike and located slightly apart, so that an oppositely positioned cam 30 may be formed between them.

The cam 30 has a transverse passage 31 extending at right angles to the axis of the cam. The closure 32 for this double valve is formed of two sections 32ª and 32ᵇ guided to slide on each other, the section 32ᵇ having a tongue 33 that is guided between two forks 34 of the other section. Small coiled springs 35 may be provided for yieldingly expanding the sections. Each fork 34 has a cam opening 36 to cooperate with the corresponding cam 29, and the tongue 33 has a cam opening 37 to cooperate with the cam 30. These cam openings are placed so as to permit free rotation of the spindle and for one direction of rotation a 90° movement will draw the section 32ª away from its seat by the cooperative action of the cams 29 and the forks 34, while the rotation in the opposite direction will draw the section 32ᵇ away from its seat through the cooperative action of the cam 30 and the tongue 33. In other respects, the construction of this type of double valve is the same substantially as that described in connection with the embodiment shown in Fig. 1.

In both types of valve the spindle may have a square head to enable it to be rotated at will by a wrench.

It is understood that the embodiment of the invention described herein is only one of the many embodiments this invention may take, and I do not wish to be limited in the practice of the invention, nor in the claims, to the particular embodiment set forth.

What I claim is:—

1. In a high pressure valve or cock, the combination of a body having a passage therethrough for the liquid and having a bore therein extending substantially at right angles to the passage, a plug rotatably mounted in the bore, and having a port therethrough to align with the passage in the open position of the valve, a spindle for the plug rotatably mounted in the body, said plug having a transverse guide opening therein, a closure mounted to slide in said guide opening, said spindle and said plug having means rendering them capable of a limited relative rotary movement on the axis of the spindle, said spindle extending completely through said closure, and a cam carried on the spindle in line with the axis of the said passage, engaging the closure and enabling the said relative rotary movement to draw the closure off of the face of the bore at said passage in the closed position of the plug.

2. In a high pressure valve or cock, the combination of a body having a passage therethrough for the liquid and having a bore therein extending substantially at right angles to the passage, a plug rotatably mounted in the bore, and having a port therethrough to align with the passage in the open position of the valve, a spindle for the plug rotatably mounted in the body, and passing loosely completely through said plug, said plug having a transverse guide opening therein, a closure mounted to slide in said guide opening, means connecting the spindle and the plug permitting a limited relative rotary movement of the spindle and the plug on the axis of the spindle, said spindle extending completely through said closure, and means carried by the spindle and engaging directly with the closure while the said relative movement occurs to draw the closure off of the wall of the body at the said passage in the opening movement of the plug.

3. In a high pressure valve or cock, the combination of a body having a passage therethrough for the liquid and having a bore therein extending substantially at right angles to the passage, a plug rotatably mounted in the bore, and having a port therethrough to align with the passage in the open position of the valve, a spindle for the plug passing completely through the plug, rotatably mounted in the body and in the plug, said plug having a transverse guide opening therein, a closure mounted to slide in said guide opening, means connecting said spindle and said plug permitting a limited relative movement of the spindle on its axis and with respect to the plug, a cam on the spindle within the plug engaging directly with the closure and operating when the plug is rotated to its open position, to draw the closure away from the wall of the body at the passage.

4. In a high pressure valve or cock, the combination of a body having a passage therethrough for the liquid and having a bore therein extending substantially at right angles to the passage, a plug rotatably mounted in the bore, and having a port therethrough to align with the passage in the open position of the valve, a spindle for the plug rotatably mounted in the body, said plug having a transverse guide opening therein, a closure mounted to slide in said guide opening, a transverse key carried by the said spindle adjacent the said plug, said plug having abutments adjacent the said key enabling the spindle to have a limited relative movement on its axis with respect to the plug, said spindle extending completely through said closure, and a cam on the spindle in line with the axis of said passage, engaging the plug and operating when the plug is moved to its open position to engage the closure and draw the same off of the face of said bore at said passage.

5. In a high pressure valve or cock, the combination of a body having a passage therethrough for the liquid and having a bore therein extending substantially at right angles to the passage, a plug rotatably mounted in the bore, a spindle for the plug rotatably mounted in the body, said plug having two sections for engaging the face of the bore at diametrically opposite points, a cam on the spindle corresponding to one of the said sections, another cam on the spindle corresponding to the other of said sections, a connection between the spindle and the plug permitting limited relative rotation of the spindle on its axis with respect to the plug so that when the plug is rotated to its open position one or the other of said cams will engage with its corresponding section of the closure and draw the same off of the face of the said bore at the said passage.

6. In a high pressure valve or cock, the combination of a body having a passage therethrough for the liquid and having a bore therein substantially at right angles to the passage, a plug rotatably mounted in the bore, a spindle for the plugs rotatably mounted in the body, a closure guided to slide transversely in the plug having two sections for engaging the face of the bore respectively at diametrically opposite points, one of said sections having a tongue and the opposite section having a slot receiving said tongue so that forks are formed in the same on each side of said tongue, a cam on the spindle received in said tongue and cams on said spindle received in said forks, a connection between the spindle and the plug permitting a limited relative rotation of the spindle on its axis with respect to the plug so that when the plug is rotated to its closed position the cams will engage with their corresponding closure sections and draw the same away from the face of the said bore at the said passage.

7. In a high pressure valve or cock, the combination of a body having a passage therethrough for the liquid and having a bore therein substantially at right angles to the passage, a plug rotatably mounted in the bore, a spindle loose in the plug rotatably mounted in the body and passing completely through the plug, a closure guided to slide in the plug to seat against the face of the bore at said passage, said spindle and said plug being capable of a limited relative rotary movement, and means on the spindle for engaging the closure and operating to positively move the same way from the face of the bore in the opening movement of the valve.

ALBERT SWANSON